United States Patent
Wang et al.

(10) Patent No.: US 7,857,659 B2
(45) Date of Patent: Dec. 28, 2010

(54) ELECTRONIC DEVICE WITH STRETCHABLE USB RECEPTACLE

(75) Inventors: Chyi-Chen Wang, Taipei (TW); Cheng-Tao Li, Taipei (TW); Wei-Sung Huang, Taipei (TW); Chiung-Wei Tzeng, Taipei (TW); Y-Ray Tsai, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 12/483,148

(22) Filed: Jun. 11, 2009

(65) Prior Publication Data

US 2010/0035463 A1 Feb. 11, 2010

(30) Foreign Application Priority Data

Aug. 5, 2008 (TW) .............................. 97129603 A

(51) Int. Cl.
*H01R 13/72* (2006.01)
(52) U.S. Cl. ...................................................... 439/501
(58) Field of Classification Search ................ 439/501, 439/652; 361/683; 362/85, 191, 253; 174/53
See application file for complete search history.

(56) References Cited

U.S. PATENT DOCUMENTS

| 5,773,757 | A | * | 6/1998 | Kenney et al. | 174/53 |
| 6,848,802 | B2 | * | 2/2005 | Chen | 362/85 |
| 7,631,983 | B2 | * | 12/2009 | Chu et al. | 362/154 |
| 2005/0178633 | A1 | * | 8/2005 | Liao | 191/12.4 |
| 2007/0115623 | A1 | | 5/2007 | Shih | |
| 2007/0258204 | A1 | * | 11/2007 | Chang et al. | 361/683 |
| 2008/0227380 | A1 | * | 9/2008 | Hsu et al. | 454/184 |

\* cited by examiner

*Primary Examiner*—Jean F Duverne
(74) *Attorney, Agent, or Firm*—Banger Shia

(57) ABSTRACT

An electronic device having a stretchable USB receptacle is provided. An extending connecting cable is added to the USB receptacle on the electronic device. In normal condition, the connecting cable is accommodated in a cable reel to make the USB receptacle accommodated in an accommodating recess of the electronic device to keep consistency of the appearance. In using condition, the USB receptacle may be taken out and used in a needed place by drawing out the connecting cable. This overcomes the disadvantage that the conventional adjacent USB receptacles may be interfered with each other, and the scope of use also increases.

9 Claims, 6 Drawing Sheets

ELECTRONIC DEVICE WITH STRETCHABLE USB RECEPTACLE

BACKGROUND OF THE INVENTION

1. Field of the Invention

The invention relates to an electronic device having a stretchable USB receptacle adapted for an electronic device having a universal serial bus (USB) receptacle such as a notebook computer and, more particularly, to an electronic device having a stretchable USB receptacle by adding an extending connecting cable to the USB receptacle.

2. Description of the Related Art

The universal serial bus (USB) is not a new bus standard, but an interface technique used in the computer field. In the end of the year 1994, USB is created by the core group of companies that consist of Intel, Compaq, Microsoft, and other multiple companies. Nowadays, it is widely used in related fields. The USB provides three speeds: the low speed (1.5 Mbps), the full speed (12 Mbps or USB 1.1) and the high speed (480 Mbps or USB 2.0). They all can provide nonsynchronous and isochronal data transmission ability through a simple and low-cost four-core wire. This meets the demands of many peripheral devices including a keypad, a mouse, a printer, a loudspeaker, a scanner, an external storage device and a digital camera.

Therefore, the universal serial bus receptacle (short for USB receptacle hereinbelow) also becomes the basic configuration of various electronic devices including a desktop computer, a notebook computer, a personal digital assistant and even a mobile phone. FIG. 1 is a schematic diagram showing the configuration of the USB receptacle in a conventional notebook computer. As shown in FIG. 1, the notebook computer 10 is composed of a host 12 and a screen 11. The screen 11 may rotate relative to the host 12 to be open or closed. Generally, the USB receptacle 13 is disposed at the front edge, the back edge, the left side or the right side of the host 12.

As shown in FIG. 1, the USB receptacle 13 is disposed on the right side of the host 12. To facilitate the usage, the USB receptacles 13 are usually multiple. Since the space of the notebook computer is limited, the USB receptacles 13 are usually adjacent to each other, and they are almost close to each other closely. When a user inserts a flash drive 14 in the USB receptacle 13, if the flash drive 14 is big in volume and inserted totally, part of the adjacent USB receptacle 13 is covered due to the structure of the flash drive 14. This makes the user fail to use the adjacent USB receptacle 13. Thus, the USB receptacle 13 is useless. In another aspect, even though the peripheral devices are a mouse, a printer, an external disk and other peripheral devices using a USB plug having an extending cable, if the notebook computer 10 is disposed in a limited space, it is also not easy to insert the USB plug to the USB receptacle 13 smoothly. Thus, the user cannot make full use of the advantage of the USB which is easy to be inserted and pulled out.

The prior application with US publication number 20070115623 provided by the applicant may solve the problem effectively. However, if the connecting cable is too long, it is not easy to be accommodated, and the risk that the connecting cable may be kinked, broken and damaged due to exceeding bending exists. If the connecting cable is short, the connecting distance is limited, and the practicability is not good.

BRIEF SUMMARY OF THE INVENTION

The electronic device having a stretchable USB receptacle disclosed in the invention includes an electronic device body, a USB receptacle, a cable reel and a connecting cable. The USB receptacle is electrically connected to the electronic device body via the connecting cable, and the electronic device body has an accommodating recess corresponding to the USB receptacle in it. In normal condition, the connecting cable is accommodated in the cable reel, and the USB receptacle is disposed in the accommodating recess of the electronic device body to keep consistency of the appearance. The USB receptacle with the connecting cable also may be drawn from the accommodating recess. Since the connecting cable is connected to the USB receptacle and the electronic device body, the USB receptacle still has the function of being connected to the electronic device body. Therefore, the USB receptacle may be taken out when it is necessary to extend the using scope of the USB receptacle. In addition, the disadvantage that the USB peripheral device is so big that the adjacent USB receptacle is covered is overcome. Furthermore, even though the operation space of the electronic device is small, a user also can draw the USB receptacle out to connect it to the USB peripheral devices smoothly. This not only facilitates the usage, but also overcomes the disadvantage that the cable is not easy to be accommodated, or the connecting cable is easy to be kinked, broken and damaged due to exceeding bending when it is too long.

These and other features, aspects and advantages of the present invention will become better understood with regard to the following description, appended claims, and accompanying drawings.

DETAILED DESCRIPTION OF THE EMBODIMENTS

Figure 1:
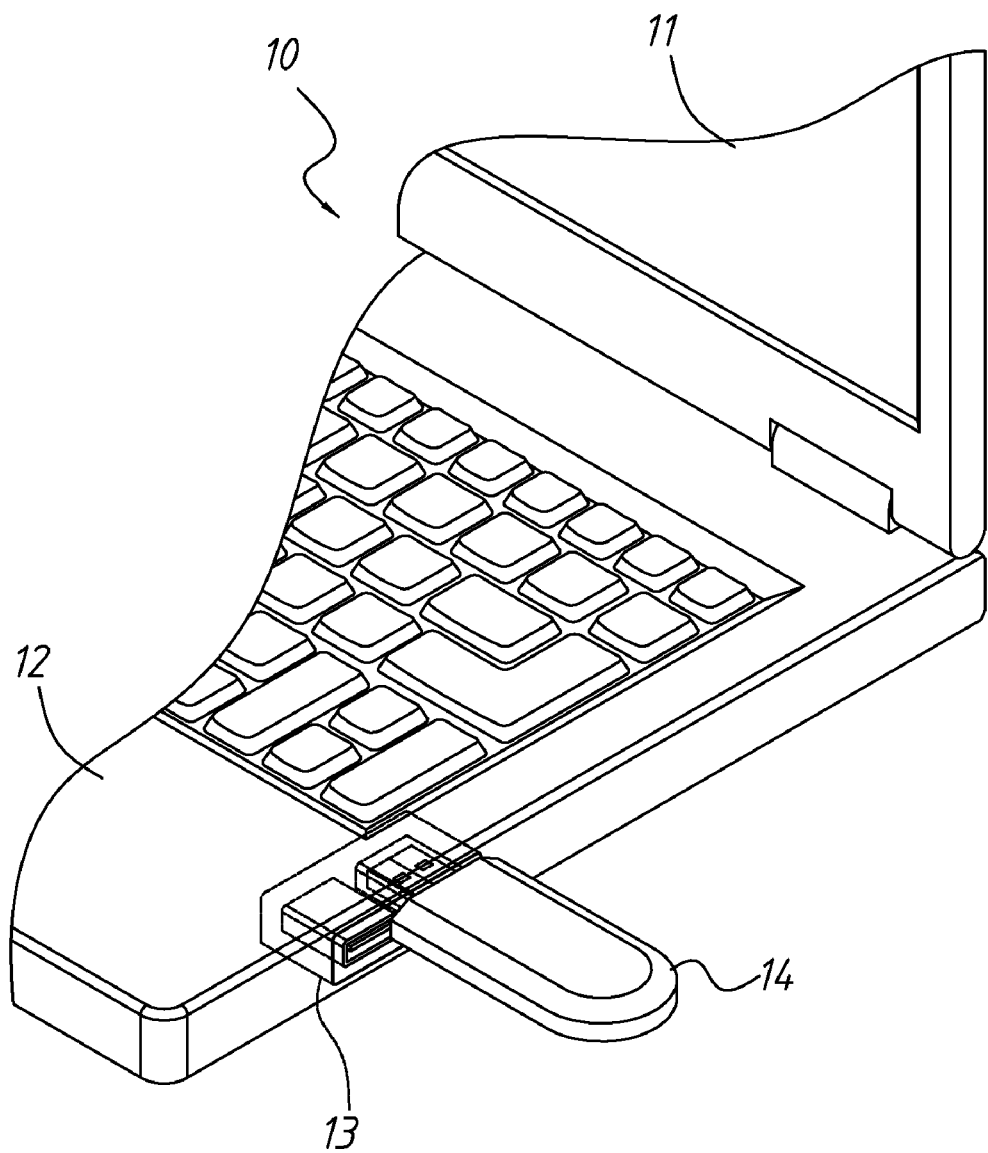
FIG. 1 is a schematic diagram showing the configuration of the USB receptacle of a conventional notebook computer.
Figure 2A:
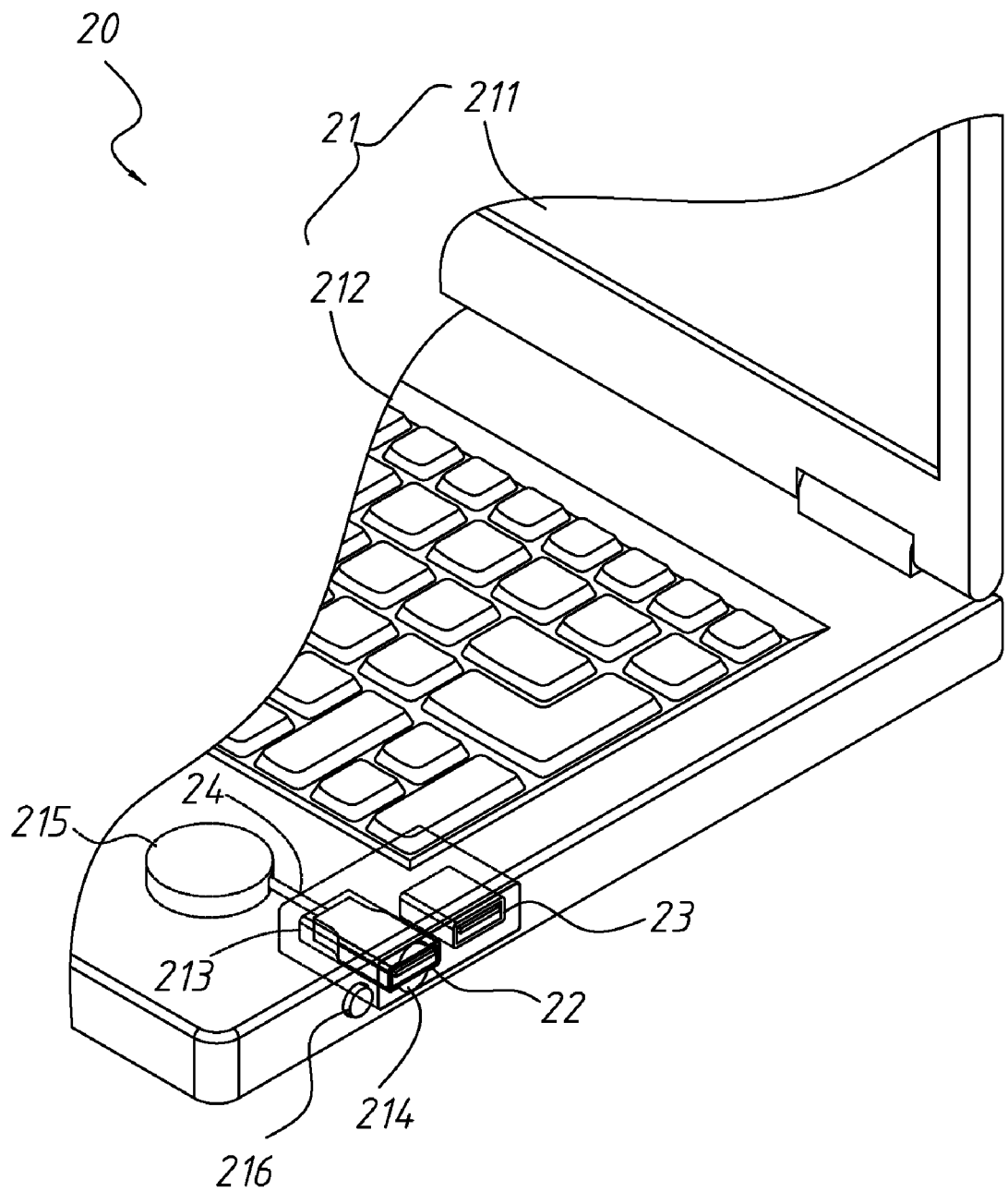
FIG. 2A and FIG. 2B are schematic diagrams showing an electronic device having a stretchable USB receptacle in the embodiment of the invention.
Figure 2B:
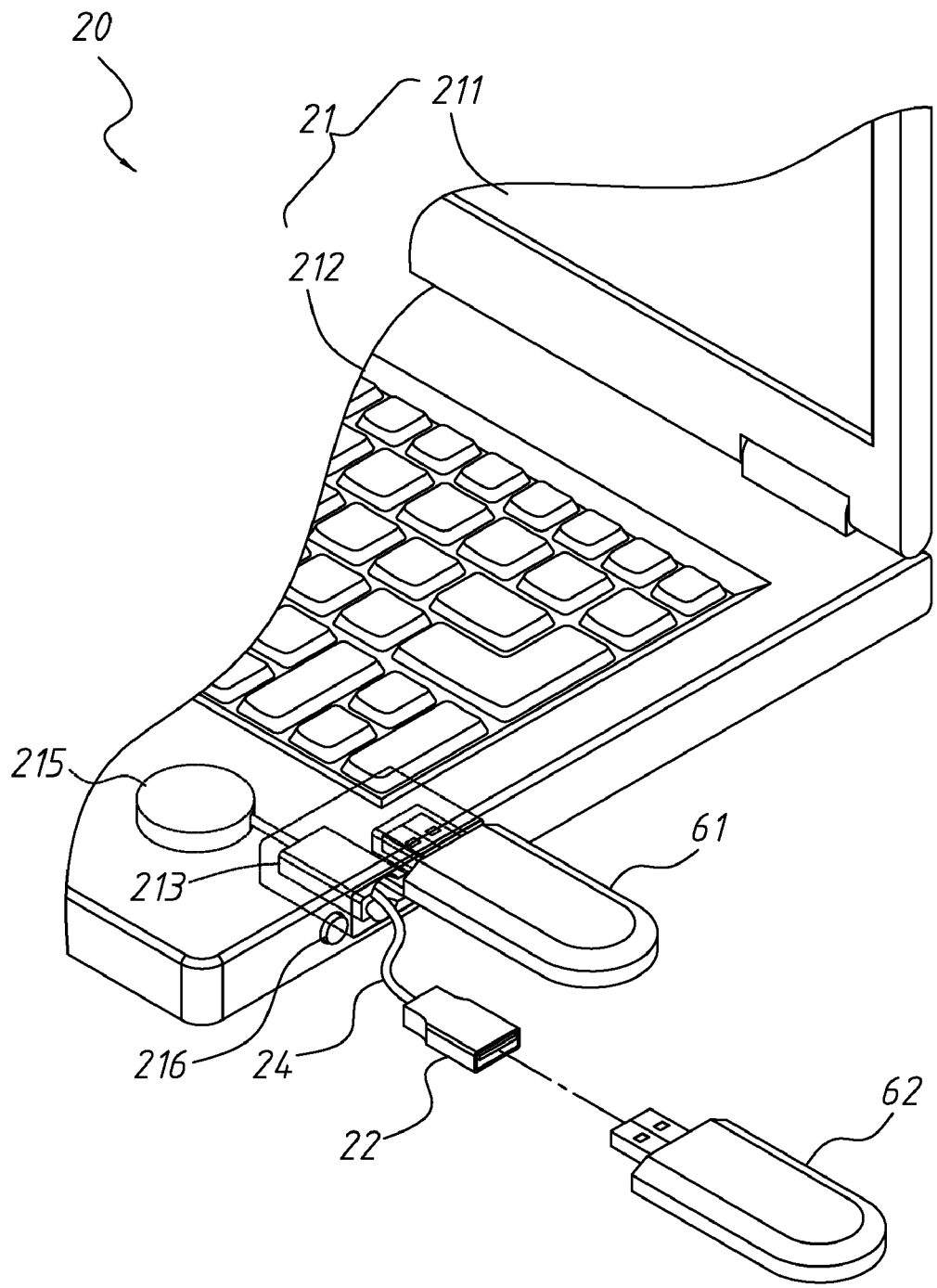

FIG. 2A and FIG. 2B are schematic diagrams showing an electronic device having a stretchable USB receptacle in the embodiment of the invention.

As shown in FIG. 2A and FIG. 2B, the electronic device 20 includes an electronic device body 21, USB receptacles (As shown in FIG. 2A and FIG. 2B, they are a first USB receptacle 22 and a second USB receptacle 23, respectively.) a cable reel 215 and a connecting cable 24. The electronic device 20 disclosed in the embodiment of the invention may be adapted for a notebook computer, a personal desktop computer, a personal digital assistant, a mobile phone and so on. The notebook computer along with the drawings herein is taken as an example, and the invention is not limited to be used in a notebook computer.

The electronic device body 21 includes a host 212 and a screen 211. The screen 211 is pivotally disposed on the host 212 to allow the screen 211 to rotate relative to the host 212 to be open and closed. The electronic device body 21 has a first USB receptacle 22 and the second USB receptacle 23, and the USB receptacles herein is used to facilitate the illustration. When they are used in a mobile phone or a personal digital assistant, the number of the USB receptacle may be only one. When they are used in a personal desktop computer, the number of the USB receptacles may be four or more. The electronic device body 21 has an accommodating recess 213, and the first USB receptacle 22 is electrically connected to the host 212 of the electronic device body 21 by a connecting cable 24. The second USB receptacle 23 is a conventional USB receptacle. The first USB receptacle 22 and the second USB receptacle 23 are shown in FIG. 2A and FIG. 2B. They are both disposed at the right side of the host 212. Similarly, they both can be disposed at the front edge, the back edge, the left side and so on.

In normal condition, the first USB receptacle 22 is disposed in the accommodating recess 213 of the host 212 of the electronic device body 21. As shown in FIG. 2A, the cross-sectional area of the accommodating recess 213 is approximately equal to that of the first USB receptacle 22. Considering tolerance and the convenience when the first USB receptacle 22 is disposed into the accommodating recess 213, the accommodating recess 213 is a little bigger than the first USB receptacle 22. Also considering that the connecting cable 24 which needs to be accommodated, the depth of the accommodating recess 213 is preferably bigger than that of the first USB receptacle 22. In disposing, after the first USB receptacle 22 is disposed in the accommodating recess 213, it is preferable that the side of the first USB receptacle 22 is approximately aligned with the side of the host 212 to keep consistency of the appearance of the electronic device 21.

As shown in FIG. 2B, when a first USB peripheral device 61 is inserted in the second USB receptacle 23 (A flash drive in FIG. 2B is taken as an example, and the peripheral device also may be a keypad, a mouse, an external CD writer or a printer), or the first USB peripheral device 61 is too big, the first USB receptacle 22 may be covered. Since the first USB receptacle 22 is an independent module, it may be taken out from the accommodating recess 213. To facilitate the process of taking out the first USB receptacle 22, an indentation recess 214 may be formed at the front edge of the accommodating recess 213 to assist the user in taking out the first USB receptacle 22. As shown in FIG. 2B, to meet the using habit of the user, the indentation recess 214 is preferably designed at the upper and the lower sides of the accommodating recess 213.

To facilitate the process of taking out the first USB receptacle 22 from the accommodating recess 213 to extend the using scope, the connecting cable needs to have a certain length. If the connecting cable 24 is only deeply accommodated in the accommodating recess 213, since the width of the accommodating recess 213 is not big, it may be inconvenient in using. In addition, since the connecting cable 24 is wound in the accommodating recess 213 for long, it may have the risk to be kinked, broken and damaged due to the exceeding bend. Therefore, to facilitate the accommodating of the connecting cable 24, a cable reel 215 is additionally disposed inside the electronic device body 21 to assist in retracting the connecting cable 24. Along with the design of the cable winding button 216, the connecting cable 24 is retracted into the cable reel 215 by pressing the cable winding button 216 to trigger the cable reel 215.

Since the first USB receptacle 22 is electrically connected to the electronic device body 21 by the connecting cable 24, the second USB peripheral device 62 also may be inserted into the first USB receptacle 22 and used after the first USB receptacle 22 is taken out. To make the first USB receptacle 22 take out of the accommodating recess 213 easily, the length of the connecting cable 24 should be bigger than the depth of the accommodating recess 213. However, the using condition is not limited thereto. In another aspect, if the notebook computer is operated in a small space, the space at the right side of the host 212 may not be enough for the second USB peripheral device 62. Thus, the first USB receptacle 22 also may be taken out and used. Even the user wants to use conveniently, he or she may utilize the invention.

Figure 3:
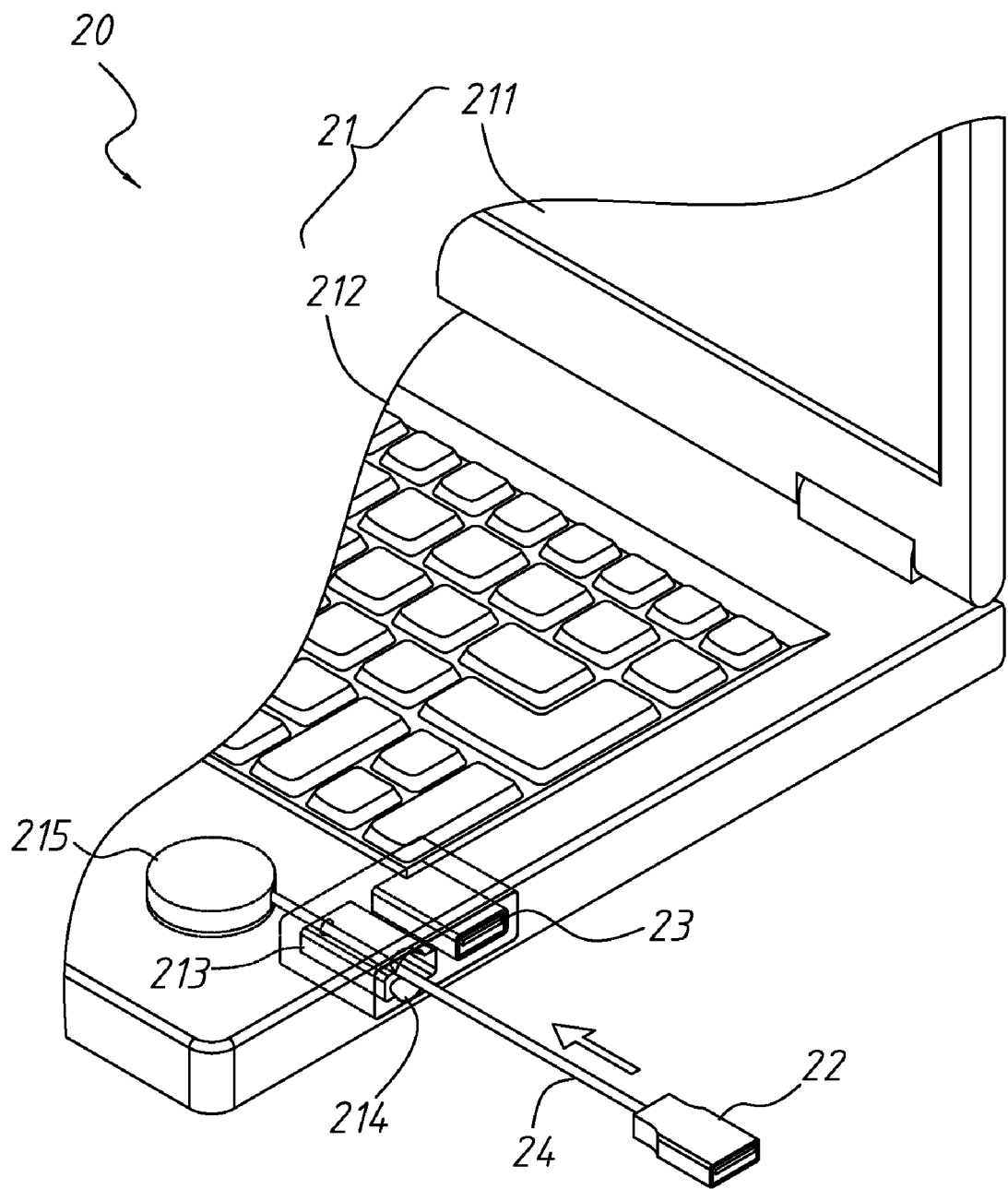
FIG. 3 is a schematic diagram showing another aspect of the electronic device having a stretchable USB receptacle when the cable is wound in the embodiment of the invention.

In another aspect, FIG. 3 is a schematic diagram showing another aspect of the electronic device having a stretchable USB receptacle when the cable is wound in the invention. As shown in FIG. 3, apart from the design mode using the cable winding button 216, the embodiment also may adopt a common design mode of the cable reel 215. That is, the connecting cable 24 is quickly drawn out to trigger the cable reel 215. Then, the connecting cable 24 is retracted in the cable reel 215.

Figure 4:
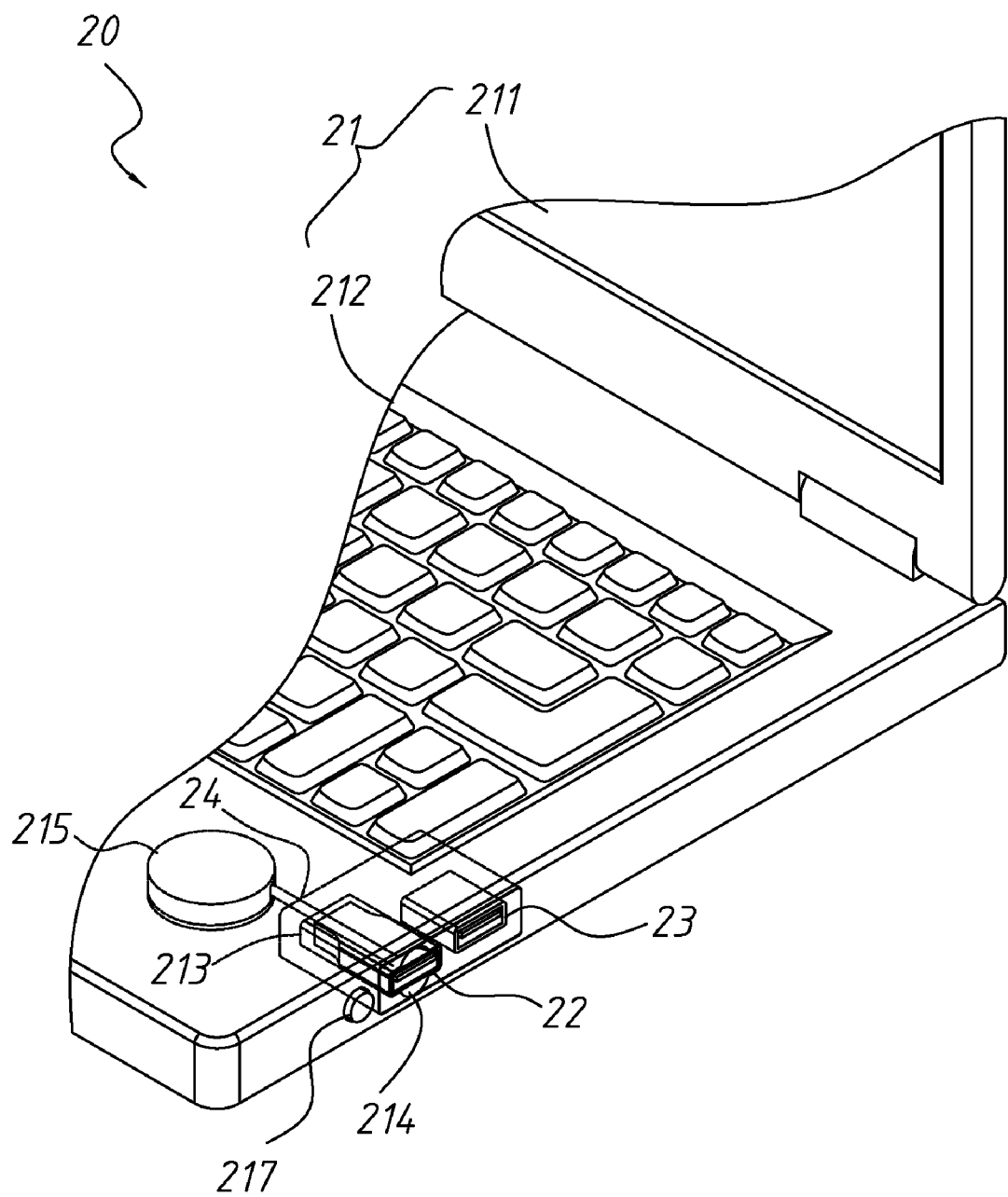
FIG. 4 is a schematic diagram showing the electronic device with the stretchable USB receptacle having an ejecting button.

As shown in FIG. 4, it is a schematic diagram showing the electronic device with the stretchable USB receptacle having an ejecting button.

Apart from the design mode of forming the indentation recess 214, an ejecting button 217 may be added to the host 212 of the electronic device body 21. The first USB receptacle 22 is taken out by pressing the ejecting button 217 to drive the mechanism, or the driving mode may be an electrical driving mode.

Figure 5:
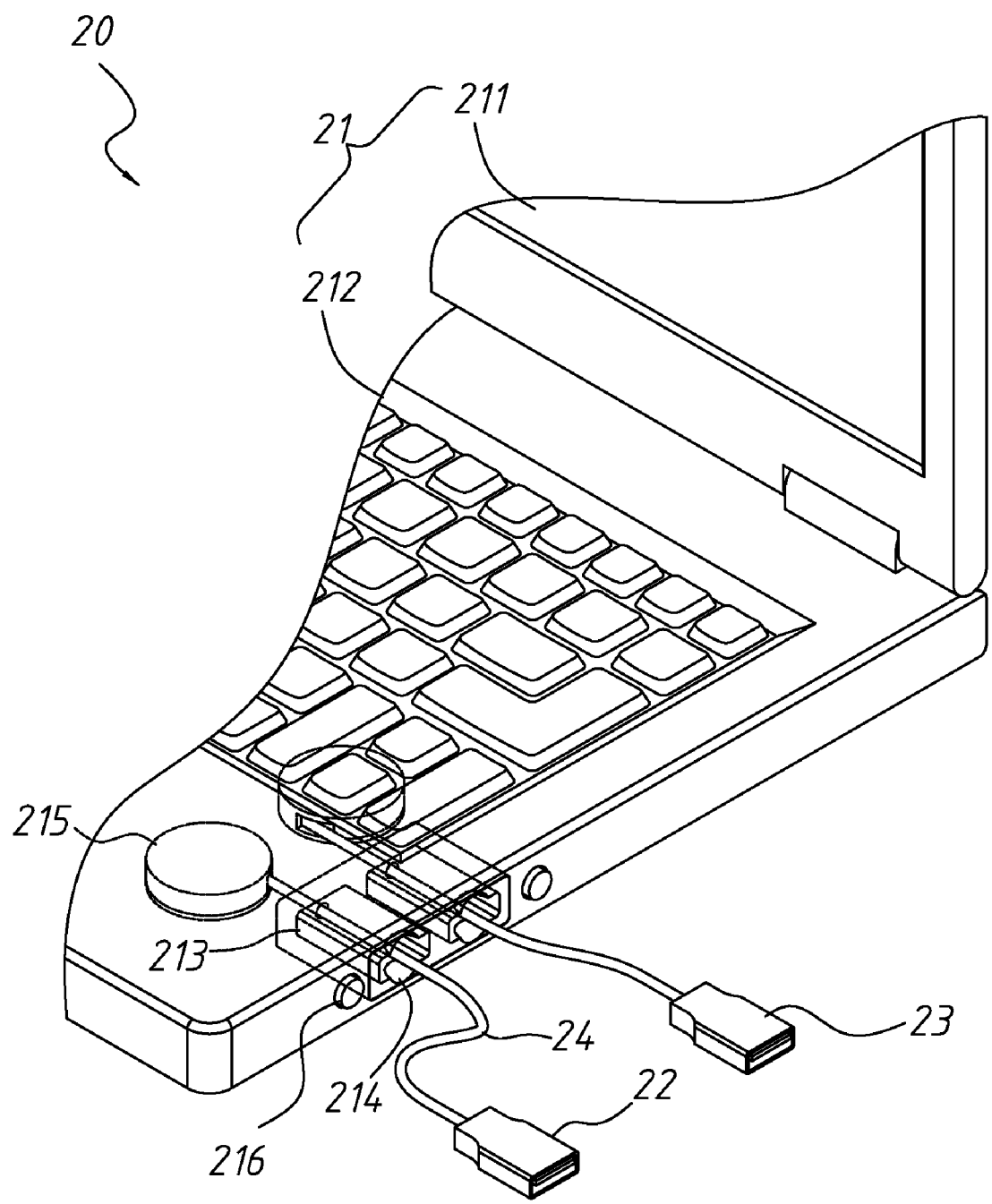
FIG. 5 is a schematic diagram showing the electronic device with the stretchable USB receptacle in another embodiment of the invention.

As shown in FIG. 5, it is a schematic diagram showing the electronic device having the stretchable USB receptacle in another embodiment of the invention.

Apart from the examples above, the second USB receptacle 23 also may be designed to have the extending function. Thus, the USB receptacle function is well performed.

Therefore, in the electronic device having the stretchable USB receptacle disclosed in the invention, the USB receptacle may be taken out when necessary. This extends the using scope of the USB receptacle, and at the same time, the disadvantage that the USB peripheral device is so big that the adjacent USB receptacle is covered is overcome. Even though space for operating the electronic device is small, the USB receptacle can be drawn out to be connected to the USB peripheral device smoothly. Along with the design of the cable reel, the connecting cable is accommodated in normal condition to prevent the connecting cable from kinking, and the risk that the connecting cable may be broken and damaged due to the exceeding bending when it is used for long may be overcome.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device comprising:
   an electronic device body having an accommodating recess;

an universal serial bus (USB) receptacle disposed at the accommodating recess of the electronic device body; and a connecting cable having a cable reel and connected to the electronic device body to make the USB receptacle electrically connected to the electronic device body, wherein the connecting cable is wound in the cable reel to keep the USB receptacle staying in the accommodating recess, and when the USB receptacle is used, the connecting cable is drawn out, and the USB receptacle leaves the accommodating recess to be extended and used;

wherein the electronic device body further has a cable winding button, and the cable winding button is used to trigger the cable reel to make the connecting cable retract into the cable reel.

2. The electronic device according to claim 1, wherein a length of the connecting cable is bigger than a depth of the accommodating recess.

3. The electronic device according to claim 1, wherein the electronic device body has an indentation recess at the front edge of the accommodating recess for taking out the USB receptacle.

4. An electronic device comprising:

an electronic device body having an accommodating recess;

an universal serial bus (USB) receptacle disposed at the accommodating recess of the electronic device body; and a connecting cable having a cable reel and connected to the electronic device body to make the USB receptacle electrically connected to the electronic device body, wherein the connecting cable is wound in the cable reel to keep the USB receptacle staying in the accommodating recess, and when the USB receptacle is used, the connecting cable is drawn out, and the USB receptacle leaves the accommodating recess to be extended and used;

wherein the cable reel retracts the connecting cable into the cable reel by drawing the connecting cable to trigger the cable reel.

5. The electronic device according to claim 4, wherein a length of the connecting cable is bigger than a depth of the accommodating recess.

6. The electronic device according to claim 4, wherein the electronic device body has an indentation recess at the front edge of the accommodating recess for taking out the USB receptacle.

7. An electronic device comprising:

an electronic device body having an accommodating recess;

an universal serial bus (USB) receptacle disposed at the accommodating recess of the electronic device body; and a connecting cable having a cable reel and connected to the electronic device body to make the USB receptacle electrically connected to the electronic device body, wherein the connecting cable is wound in the cable reel to keep the USB receptacle staying in the accommodating recess, and when the USB receptacle is used, the connecting cable is drawn out, and the USB receptacle leaves the accommodating recess to be extended and used;

wherein the electronic device body has an ejecting button via which the USB receptacle leaves the accommodating recess.

8. The electronic device according to claim 7, wherein a length of the connecting cable is bigger than a depth of the accommodating recess.

9. The electronic device according to claim 7, wherein the electronic device body has an indentation recess at the front edge of the accommodating recess for taking out the USB receptacle.

* * * * *